(12) United States Patent
Giezen et al.

(10) Patent No.: US 6,677,386 B1
(45) Date of Patent: Jan. 13, 2004

(54) BIOPOLYMER NANOPARTICLES

(75) Inventors: Franciscus Egenius Giezen, Utrecht (NL); Remigius Oene Jules Jongboom, Zetten (NL); Herman Feil, Ede (NL); Kornelis Fester Gotlieb, Assen (NL); Arjen Boersma, Den Bosch (NL)

(73) Assignee: ATO B.V., Wageningen (NL)

( * ) Notice: Subject to any disclaimer, the term of this patent is extended or adjusted under 35 U.S.C. 154(b) by 0 days.

(21) Appl. No.: 09/889,921

(22) PCT Filed: Jan. 25, 2000

(86) PCT No.: PCT/NL00/00050

§ 371 (c)(1),
(2), (4) Date: Oct. 24, 2001

(87) PCT Pub. No.: WO00/69916

PCT Pub. Date: Nov. 23, 2000

(30) Foreign Application Priority Data

Jan. 25, 1999 (EP) .............................. 99200203

(51) Int. Cl.$^7$ .................. B01F 3/12; C08B 30/12; C08B 31/00; C08J 3/12; C08L 3/02
(52) U.S. Cl. ................ 516/31; 106/206.1; 127/33; 264/211.11; 424/499; 514/951; 516/77; 516/105; 536/104
(58) Field of Search ................ 516/31, 77, 105; 536/104; 127/33; 264/211.11; 106/206.1; 424/499; 514/951

(56) References Cited

U.S. PATENT DOCUMENTS

| | | | | |
|---|---|---|---|---|
| 3,666,557 A | * | 5/1972 | Jensen et al. | ........... 516/105 X |
| 4,072,535 A | * | 2/1978 | Short et al. | ............... 127/32 X |
| 4,107,288 A | * | 8/1978 | Oppenheim et al. | |
| 5,151,264 A | * | 9/1992 | Samain et al. | .......... 424/499 X |
| 5,208,267 A | * | 5/1993 | Neumann et al. | |
| 5,275,774 A | * | 1/1994 | Bahr et al. | .......... 264/211.11 X |
| 5,412,005 A | * | 5/1995 | Bastioli et al. | ................ 524/47 |
| 6,001,408 A | * | 12/1999 | Dudacek et al. | ........ 426/578 X |
| 6,147,175 A | * | 11/2000 | Bonhoure et al. | ........ 127/33 X |
| 6,238,677 B1 | * | 5/2001 | Fanta et al. | ............. 424/499 X |

FOREIGN PATENT DOCUMENTS

| | | | |
|---|---|---|---|
| EP | 0 118 240 | * | 9/1984 |
| EP | 0 525 245 | * | 2/1993 |
| FR | 2 265 762 | * | 10/1975 |

* cited by examiner

Primary Examiner—Richard D. Lovering
(74) Attorney, Agent, or Firm—Young & Thompson

(57) ABSTRACT

A process for producing biopolymer nanoparticles is described, in which the biopolymer is plasticised using shear forces, a crosslinking agent being added during the processing. After said processing. After said processing, the biopolymer can be dissolved or dispersed in an aqueous medium to a concentration between 4 and 40 wt. %. This results in starch nanoparticles which are characterized by an average particle size of less than 400 nm.

21 Claims, 1 Drawing Sheet

BIOPOLYMER NANOPARTICLES

This application is a 371 of PCT/NL 00/00050 filed on Jan. 25, 2000.

The invention relates to a process for producing nanoparticles, i.e. particles essentially consisting of a biopolymer such as starch. The invention also relates to nanoparticles obtainable by such a process.

U.S. Pat. No. 5,116,890 discloses self-crosslinking latices on the basis of a starch emulsion polymer graft. These latices require undesirable chemicals and are too hydrophobic for many applications.

It was found that biopolymers such as starch and other polysaccharides such as cellulose and gums, as well as proteins (e.g. gelatin, whey protein) can be formed into nanoparticles by processing the biopolymer using shear forces and simultaneous cross-linking. The biopolymers may be previously modified, e.g. with cationic groups, carboxy-methyl groups, by acylation, phosphorylation, hydroxyalkylation, oxidation and the like. Starch and mixtures of starch with other (bio)polymers containing at least 50% starch are preferred. The biopolymer preferably has a dry substance content of at least 50%, especially at least 60% by weight at the time when processing starts.

Processing using shear forces according to the invention means a mechanical treatment, which is in particular an extrusion treatment performed at elevated temperature (above 40° C., especially above 60° C., below the degradation point of the polymer, up to e.g. 200° C., especially up to 140° C.) under conditions of high shear. The shear can be effected by applying at least 100 J of specific mechanical energy (SME) per g of biopolymer. Depending on the processing apparatus used the minimum energy may be higher; also when non-pregelatinised material is used, the minimum SME may be higher, e.g. at least 250 J/g, especially at least 500 J/g.

The mechanical treatment is conveniently performed at elevated temperature. The elevated temperature may be moderated, in case of starch, by using an alkaline medium or by using pregelatinised starch. During the mechanical treatment, the biopolymer is present in high concentration, especially a concentration of at least 40, more preferably at least 50 wt. %, in an aqueous solvent, such as water or a water/alcohol mixture. High pressure (e.g. between 5 and 150 bar) may be applied to facilitate processing at high concentrations.

A plasticiser may be present in addition to the water or water/alcohol mixture, such as a polyol (ethyleneglycol, propyleneglycol, polyglycols, glycerol, sugar alcohols, area, citric acid esters, etc.) at a level of 5–40% by weight of the biopolymer. However, water can already act as a plasticiser. The total amount of plasticisers (i.e. water and other such as glycerol) is preferably between 15 and 50%. A lubricant, such as lecithin, other phospholipids or monoglycerides, may also be present, e.g. at a level of 0.5–2.5% by weight. An acid, preferably a solid or semi-solid organic acid, such as maleic acid, citric acid, oxalic, lactic, gluconic acid, or a carbohydrate-degrading enzyme, such as amylase, may be present at a level of 0.01–5% by weight of biopolymer; the acid or enzyme assists in slight depolymerisation which is assumed to be advantageous in the process of producing nanoparticles of a specific size.

An essential step in the process of the invention is the crosslinking during the mechanical treatment. The crosslinking is preferably reversible, i.e. the crosslinks are partly or wholly cleaved after the mechanical treatment step. Suitable reversible crosslinkers include those which form chemical bonds at low water concentrations, which dissociate or hydrolyse in the presence of higher water concentrations. This mode of crosslinking results in a temporary high viscosity during processing followed by a lower viscosity after processing.

Examples of reversible crosslinkers are dialdehydes and polyaldehydes, which reversibly form hemiacetals, acid anhydrides and mixed anhydrides (e.g. succinic and acetic anhydride) and the like. Suitable dialdehydes and polyaldehydes are glutaraldehyde, glyoxal, periodate-oxidised carbohydrates, and the like. Glyoxal is a particularly suitable crosslinker for the purpose of the invention.

Such crosslinkers may be used alone or as a mixture of reversible crosslinkers, or as a mixture of reversible and non-reversible crosslinkers. Thus, conventional crosslinkers such as epichlorohydrin and other epoxides, triphosphates, divinyl sulphone, can be used as non-reversible crosslinkers for polysaccharide biopolymers, while dialdehydes, thiol reagents and the like may be used for proteinaceous biopolymers. The crosslinking reaction may be acid- or base-catalysed. The level of crosslinking agent can conveniently be between 0.1 and 10 weight % with respect to the biopolymer. The crosslinking agent may already be present at the start of the mechanical treatment, but in case of a non-pre-gelatinised biopolymer such as granular starch, it is preferred that the crosslinking agent is added later on, i.e. during the mechanical treatment.

The mechanically treated, crosslinked biopolymer is then formed into a latex by dispersion in a suitable solvent, usually water and/or another hydroxylic solvent such as an alcohol), to a concentration of between 4 and 50 wt. % especially between 10 and 40 wt. %. Prior to the dispersion a cryogenic grinding step may be performed, but stirring with mild heating may work equally well. This treatment results in a gel which either spontaneously or after induction by water adsorption, is broken into a latex. This viscosity behaviour can be utilised for applications of the particles, such as improved mixing, etc. If desired, the dispersed biopolymer may be further crosslinked, using the same or other crosslinking agents as describe above.

The invention pertains to an extrudate obtained by plasticising a biopolymer, in particular starch, and crosslinking it as described above. The extrudate is characterised by swelling in an aqueous solvent, e.g. water or a mixture of at least 50% water with a water-miscible solvent such as an alcohol, and by exhibiting a viscosity drop afterwards to produce a dispersion of nanoparticles.

The invention also pertains to the nanoparticles obtainable from the extrudate referred to above. The nanoparticles (as such or as a dispersion) are characterised by their small particle size of below 400 nm, especially below 200 nm, their stability, narrow particle size distribution and viscosity. The narrow particle distribution is in particular reflected by the ratio of weight-averaged molecular weight to number-averaged molecular weight being below 2 ($M_w/M_n<2$).

The nanoparticles can be used as a matrix material i.e. as a resin e.g. in coating applications wherein an increased dry solids content is desired. Such matrix materials may be a film-forming material (for adjusting the minimum film-forming temperature), a thickener, or a rheology modifier, or an adhesive or an adhesive additive (tackifier). As a thickener, it may have higher viscosities, e.g. greater than 150 mPas. The nanoparticles or dispersions thereof may also be used for their barrier properties (high barrier for e.g. oxygen, low barrier e.g. for water), as a carrier (e.g. for colorants, medicaments, flavours and fragrances and the like, advantageously as a slow-release agent), as a fat replacer (due to their mouth-feel), in cosmetic compositions (lack of allergenic properties) etc., as a medicament for mitigating dermal disorders, bums and the like. Further examples of such applications are in the paper-making and packaging industry (paper and cardboard surface treatrnent, gloss etc.), or in agriculture and horticulture (protective layers on e.g. bulbs, and other plan t arts), or as removable or temporary coatings for protection purposes. The nanoparticles can also be used as excipients or carriers e.g. in medicines, where they may be complexed or covalently coupled to active substances such as slow-release drugs. The nanoparticles can also be processed into a foam at relatively high density.

EXAMPLE 1

Extrusion

Figure 1:
FIGS. 1 and 2 show two screw configurations of the extruder used in the examples.
Figure 2:
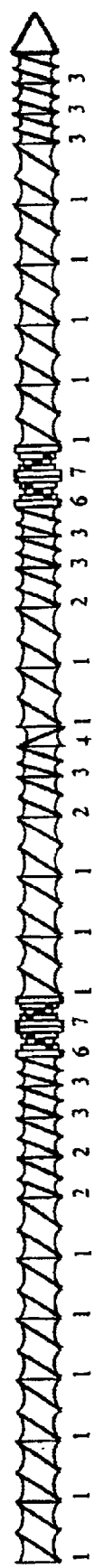

A premix of native potato starch (12.6 kg, moisture content 18%, Avebe) and glycerol (2.4 kg=16 wt. % of premix) was prepared at room temperature in a Bear Varimixer for 15 minutes to produce a homogeneous premix. The premix was fed into an extruder (Berstorff ZE40 self-wiping, co-rotating twin screw extruder, 38D) at a rate of 8.4 kg/hr with a K-Tron K2M &85 volumetric feeder. The extruder has 9 zones with an adjusted temperature profile of 20–80–90–100–100–100–100–100–95° C. Screw configuration 1 (Figure) was used. The screw speed was set at 160 rpm. A 5 wt. % solution of glyoxal in water was injected in the barrel at the 5th zone (22D), at a flow rate of 1.2 kg/hr with a Prominent Meta HK20-12,5S piston dosing pump. As a result, the pure glyoxal percentage in relation to the dry amount of starch was 1%. The extrudate left the extruder through a five-hole die (diameter of holes 3 mm) and was subsequently granulated.

Latex Preparation (1)

The granules were cryogenically ground and sieved to obtain particles smaller than 150 μm. Subsequently, this powder was mixed with water. The amount of powder was adjusted to the desired solid load in the final dispersion. After stirring the mixture at room temperature, a strong gel was formed. This gel collapsed after some time, and a low-viscous homogeneous transparent light-brown dispersion was formed. The viscosity of 10w/w % dispersion was measured with a Brookfield DV-III Viscometer, showing a viscosity of 26 mPa.s at a shear rate of 55 $s^{-1}$ at room temperature. The particle radii in a 10 w/w % dispersion were determined by means of DLS (Dynamic Light Scattering), showing values between 10 nm and 500 nm, and a calculated average particle radius of 54 nm.

Latex Preparation (2)

The granules were cryogenically ground and sieved to obtain particles smaller than 500 μm. 10 g of this powder was mixed with 90 g of water. After stirring the mixture at room temperature, a strong gel was formed. This gel collapsed after some time, and a low-viscous homogeneous transparent light-brown dispersion was formed. The particle radii were determined by means of DLS (Dynamic Light Scattering), showing values between 10 nm and 500 nm.

Latex Preparation (3)

10 g of the granules were mixed with 90 g of water. After stirring the mixture at 50° C. for 2 hr a low viscous dispersion was formed. After filtering of the dispersion over a 150 μm filter cloth the particle sizes were determined by means of DLS, showing radii between 10 nm and 500 nm.

Latex preparation (4)

20 g of the granules were mixed with 80 g of water. After stirring the mixture at 50° C. for 2 hr a low viscous dispersion was formed. After filtering of the dispersion over a 150 μm filter cloth the viscosity of the dispersion was determined with a Brookfield DV-III Viscometer, showing a viscosity of 825 mPa.s at a shear rate of 55 $s^{-1}$ at room temperature.

Film Formation

The dispersion obtained above (20 g) was casted into a polystyrene tray (casting onto glass, paper is also feasible) and, subsequently dried at room temperature. After two days a transparent strong starch film remained.

EXAMPLES 2–6

Example 1 was repeated in a continuous mode: 8.81 kg of premix (containing 6.48 kg of dry potato starch, 18.0 wt. %=1.17 kg of water and 17.9 wt. %=1.16 kg of glycerol) was fed per hour. A glyoxal solution containing 5–10–15 wt. % of glyoxal in water (0.93–1.86–2.80 wt. % with respect to dry starch) was fed at a rate of 1.2 kg/hour. The results are presented in the following table.

TABLE

Results of continuous thermomechanical treatment and crosslinking

| example | 2 | 3 | 4 | 5 | 6 |
|---|---|---|---|---|---|
| X-link wt. %[1] | 10 | 15 | 5 | 10 | 10 |
| screw speed | 200 | 200 | 100 | 100 | 250 |
| screw conf.[2] | 1 | 1 | 1 | 1 | 2 |
| SME (J/g) | 1765 | 1818 | 972 | 1186 | 3316 |
| viscosity[3] mPas | 27.8 | 17.0 | 185.0 | 118.3 | 17.5 |
| particle radius nm | 42.5 | 36.9 | 101.4 | 53.4 | 41.9 |

[1]concentration of crosslinker in water (1% corresponding to about 0.186 wt. % with respect to dry starch
[2]see accompanying figure
[3]determined of a 10% dispersion at 186 $s^{-1}$ and 20° C.

EXAMPLE 7

A premix of waxy corn starch (moisture content 11.5%, Meritena 300, Amylum), glycerol (18%, based on dry starch) and water (total water content adjusted to 22%, based on dry starch) was fed into the feeding zone of a Berstorff ZE40 extruder (L/D=38) at a rate of 8.8 kg/h. The temperature profile in the extruder was similar to the one described in example 1. Screw configuration 1 was used and the screw speed was set on 200 rpm. A glyoxal solution of 10% in water was fed in the 5th zone (22D) at a rate of 1.2 kg/h. The extrudate was dried and granulated. Dispersion preparation was performed as described in example 1 (latex preparation 1). A 20% dispersion was obtained having a Brookfield viscosity of 225 mPas at a shear rate of 20 $s^{-1}$.

EXAMPLE 8

A premix of waxy rice starch (moisture content 14%, Remyline AX-DR, Remy), glycerol (18%, based on dry starch) and water (total water content adjusted to 22%, based on dry starch) was fed into the feeding zone of a Berstorff ZE40 extruder (L/D=38) at a rate of 8.8 kg/h. The temperature profile in the extruder was similar to the one described in example 1. Screw configuration 1 was used and the screw speed was set on 200 rpm. A glyoxal solution of 10% in water was fed in the 5th zone (22D) at a rate of 1.2 kg/h. The extrudate was dried and granulated. Dispersion preparation was performed as described in example 1 (latex preparation 1). A 20% dispersion was obtained having a Brookfield viscosity of 253 mPas at a shear rate of 20 $s^{-1}$.

EXAMPLE 9

A premix of modified (acetylated and crosslinked) waxy corn starch (moisture content 12.7%, Resistarnyl 342, Amylum), glycerol (18%, based on dry starch) and water (total water content adjusted to 22%, based on dry starch) was fed into the feeding zone of a Berstorff ZE40 extruder (L/D=38) at a rate of 8.8 kg/h. The temperature profile in the extruder was similar to the one described in example 1. Screw configuration 1 was used and the screw speed was set on 200 rpm. A glyoxal solution of 10% in water was fed in the 5th zone (22D) at a rate of 1.2 kg/h. The extrudate was dried and granulated. Dispersion preparation was performed as described in example 1 (latex preparation 1). A 20% dispersion was obtained having a Brookfield viscosity of 180 mPas at a shear rate of 20 $s^{-1}$.

EXAMPLE 10

A premix of waxy corn starch (moisture content 11.5%, Meritena 300, Amylum), glycerol (18%, based on dry starch), water (total water content adjusted to 22%, based on dry starch) and maleic acid (0.5% based on dry starch) was fed into the feeding zone of a Berstorff ZE40 extruder (L/D=38) at a rate of 8.8 kg/h. The temperature profile in the extruder was similar to the one described in example 1. Screw configuration 2 was used and the screw speed was set on 200 rpm. A glyoxal solution of 10% in water was fed in the 5th zone (22D) at a rate of 1.2 kg/h. The extrudate was dried and granulated. Dispersion preparation was performed as described in example 1 (latex preparation 1). A 35% dispersion was obtained having a Brookfield viscosity of 1400 mPas at a shear rate of 20 $s^{-1}$.

What is claimed is:

1. A process for producing bipolymer nanoparticles, in which the biopolymer is plasticised by processing using shear forces, a crosslinking agent being present during the processing, and the biopolymer is dissolved or dispersed in a hydroxylic solvent.

2. A process according to claim 1, wherein the biopolymer is starch or a starch derivative or a polymer mixture containing at least 50% starch.

3. A process according to claim 1, wherein the processing is carried out at a temperature of between 40 and 200° C.

4. A process according to claim 1, wherein shear forces are used corresponding to a mechanical energy input of at least 100 J/g.

5. A process according to claim 1, wherein the biopolymer has a dry substance content during processing of at least 50% by weight.

6. A process according to claim 1, wherein the processing comprises extrusion.

7. A process according to claim 1, further comprising preparing an extrudate, and preparing a latex from said extrudate, with or without filtering.

8. A process according to claim 1, wherein the crosslinking agent is a dialdehyde or polyaldehyde.

9. A process according to claim 8, wherein the crosslinking agent is a glyoxal.

10. A process according to claim 1, wherein 1–40 wt. %, based on the weight of the biopolymer of an additional plasticiser is present during the processing.

11. A process according to claim 10, wherein the plasticizer is glycerol.

12. A process according to claim 1, wherein 0.01–5%, based on the weight of the biopolymer, of an acid is present during processing.

13. A process according to claim 12, wherein the acid is selected from the group consisting of maleic acid, oxalic acid and citric acid.

14. A process according to claim 1, wherein 0.01–5%, based on the weight of the biopolymer, of an enzyme is present during processing.

15. A process according to claim 14, wherein the enzyme is amylase.

16. A process according to claim 1, wherein after said processing, the biopolymer is dissolved or dispersed in an aqueous medium to a concentration between 4 and 50 wt. %.

17. A process according to claim 16, wherein the dispersion of the biopolymer is further crosslinked after said processing.

18. Cross-linked starch nanoparticles which are characterized by an average particle size of less than 400 nm and a ratio of weight-averaged molecular weight to number-averaged molecular weight ($M_w/M_n$) below 2.

19. A dispersion of crosslinked starch nanoparticles according to claim 18 in water.

20. A dispersion according to claim 19, having a viscosity at a concentration of 10% by weight at 186 $s^{-1}$ of below 150 mPas.

21. A extrudate of crosslinked polymer containing at least 50% starch, which swells upon immersion in an aqueous medium and forms a low viscous dispersion after immersion.

* * * * *